United States Patent [19]
Shapiro

[11] Patent Number: 6,058,334
[45] Date of Patent: May 2, 2000

[54] APPARATUS AND METHOD FOR DESIGNING AND PERFORMING A PROCESS SUCH AS A MANUFACTURING PROCESS

[75] Inventor: Boris Shapiro, Timrat, Israel

[73] Assignee: Proactivity Software Solutions Ltd., Yokneam Illit, Israel

[21] Appl. No.: 08/820,978

[22] Filed: Mar. 19, 1997

[30] Foreign Application Priority Data

Jun. 18, 1996 [IL] Israel .......................................... 118682

[51] Int. Cl.⁷ ..................................................... G06F 19/00
[52] U.S. Cl. .............................. 700/97; 700/98; 700/100; 700/104; 700/117
[58] Field of Search ................................. 700/17, 95, 96, 700/97, 98, 103, 104, 117, 121

[56] References Cited

U.S. PATENT DOCUMENTS

| | | | |
|---|---|---|---|
| 4,807,108 | 2/1989 | Ben-Arieh et al. | 364/148 |
| 5,539,906 | 7/1996 | Abraham et al. | 395/600 |
| 5,555,361 | 9/1996 | Narita et al. | 395/144 |
| 5,673,198 | 9/1997 | Lawman et al. | 364/489 |
| 5,694,325 | 12/1997 | Fuduka et al. | 364/468.28 |

OTHER PUBLICATIONS

Lee. J. et al.,: "Task–Based Specifications Throgh Conceptual Graphs", IEEE Expert, vol. 11, No. 4, Aug. 1996, pp. 60–70, XP000627018.

Shapiro. B.I.,: "Computer–Aided Design System for a General Purpose: Structure and Methods of Applications", XP002051600. (Abstract).

Marcias. B. Et al.,: "A Method for Controlling the Production of Specifications in Natural Language", Computer Journal, vol. 38, No. 4, Jan. 1 1995, pp. 310–318, XP000580022.

Bucci. G. et al.,: "Tools for Specifying Real–Time Systems", Real Time Systems, vol. 8, No. 2/03, Mar. 1 1995, pp. 117–172, XP000517036.

Mcfarland. M. C. Et al.,: "The High Level Synthesis of Digital Systems", Proceedings of the IEEE, vol. 78, No. 2, Feb. 1 1990, pp. 301–318, XP000128906.

Cao, et al.,: "Task Decomposition and Analysis of Robotic Assembly Task Plans Using Petri Nets", IEEE Transactions on Industrial Electronics, vol. 41, No. 6, Dec. 1994, pp. 620–629, XP000506430.

Shapiro, B., et al., Problems of CAD Technology Development, Assembly of Kiev Cybernetics Institute, USSR Academy of Science, 1983, (in Russian), pp.40–47.

Shapiro, B., CAD/CAE System for General Purpose, Structure, Functions, Application Methods, Control Systems and Devices, No. 2, 1987 (in Russian), pp. 3–5.

Shapiro, B., CAD Technology Model Development and Application, XII International Congress IKM, Weimar, Germany, 1990, (in Russian), pp. 83–86.

J. Corbett, et al., A CAD–Integrated Knowledge Based System for the Design of Die Case Components, Annals of the CIRP, 40/1/1991, pp. 103–105.

Suh, Nam P., et al., Design of Thinking Design Machine, Annals of CIRP, 39/1/1990, pp. 145–148.

Encarnacao, J., et al., Computer Aided Design: Fundamentals and System Architectures, Springer–Verlag, New York, 1983, pp. 37–81.

*Primary Examiner*—Paul P. Gordon
*Assistant Examiner*—Ramesh Patel
*Attorney, Agent, or Firm*—Abelman, Frayne & Schwab

[57] ABSTRACT

A method for designing and performing a process, the method including: (a) generating a definition of the process, the generating step including: (i) defining an output of the process; and (ii) defining a plurality of activities forming at least one sequence of activities which lead to the output, including defining complete information which includes, for each of the plurality of activities: input information, including a source thereof, and output information, including a destination thereof; and (b) carrying out the process at least partly in accordance with the definition of the process.

Apparatus for designing the process is also disclosed.

21 Claims, 10 Drawing Sheets

Microfiche Appendix Included
(5 Microfiche, 422 Pages)

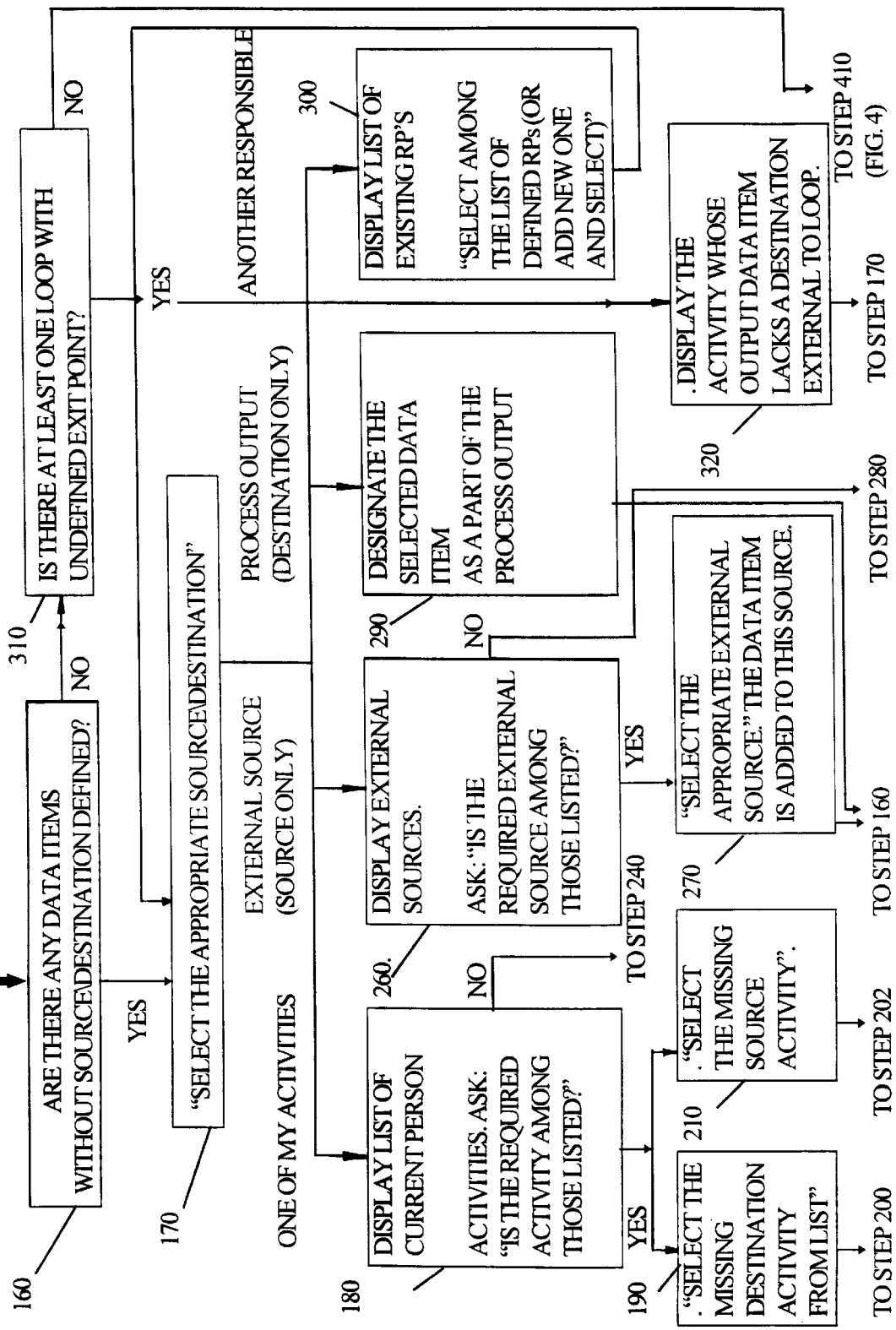

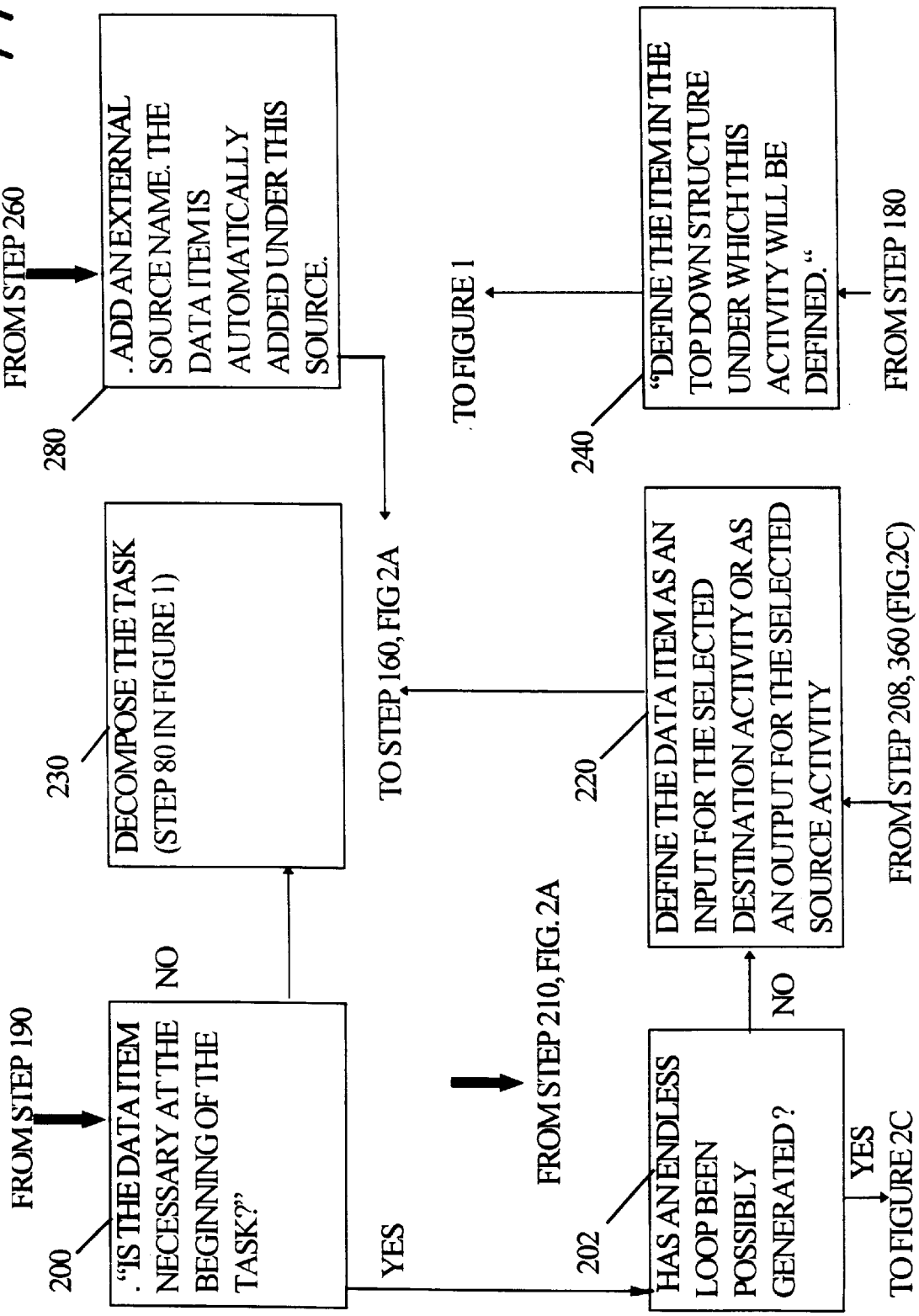

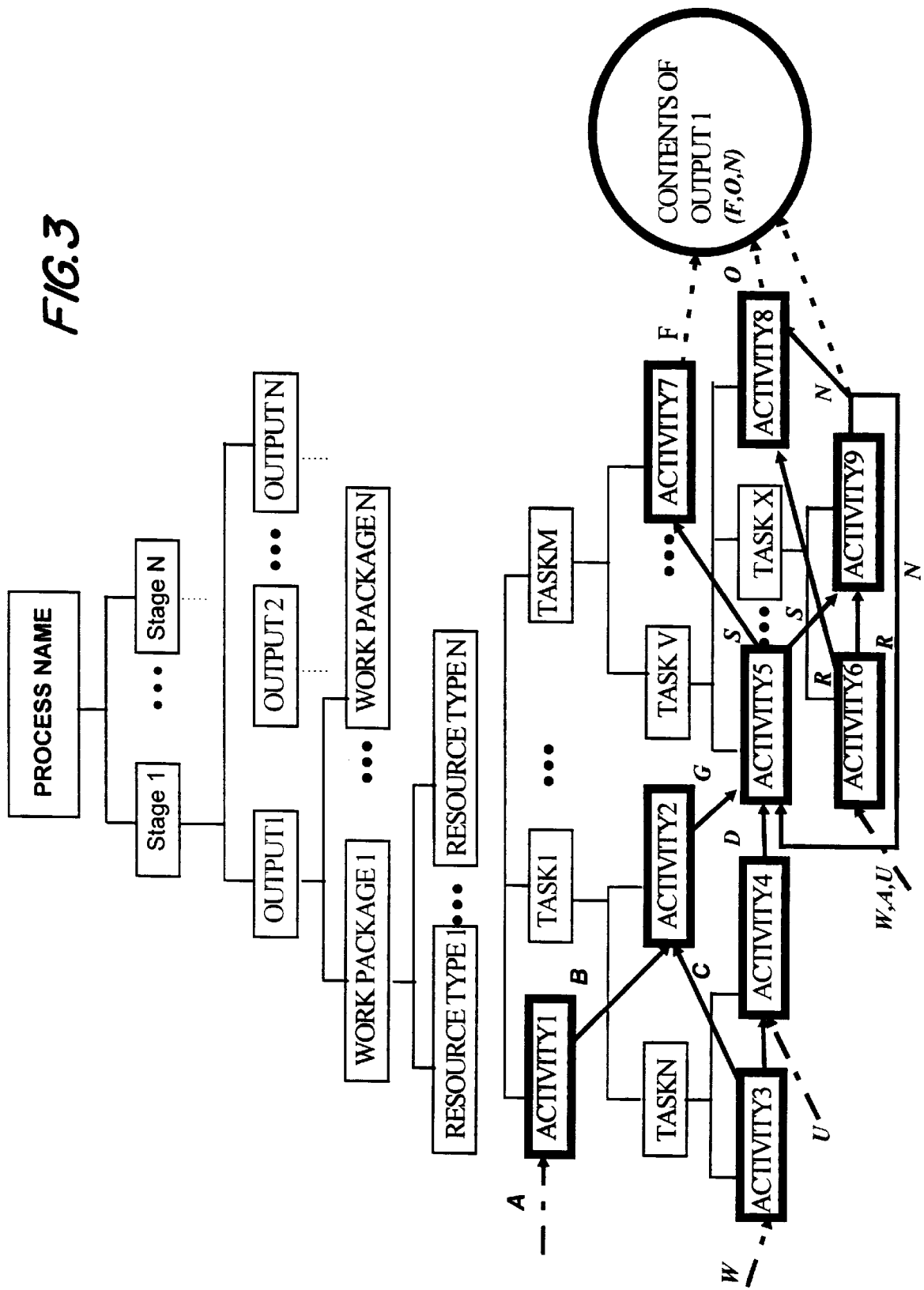

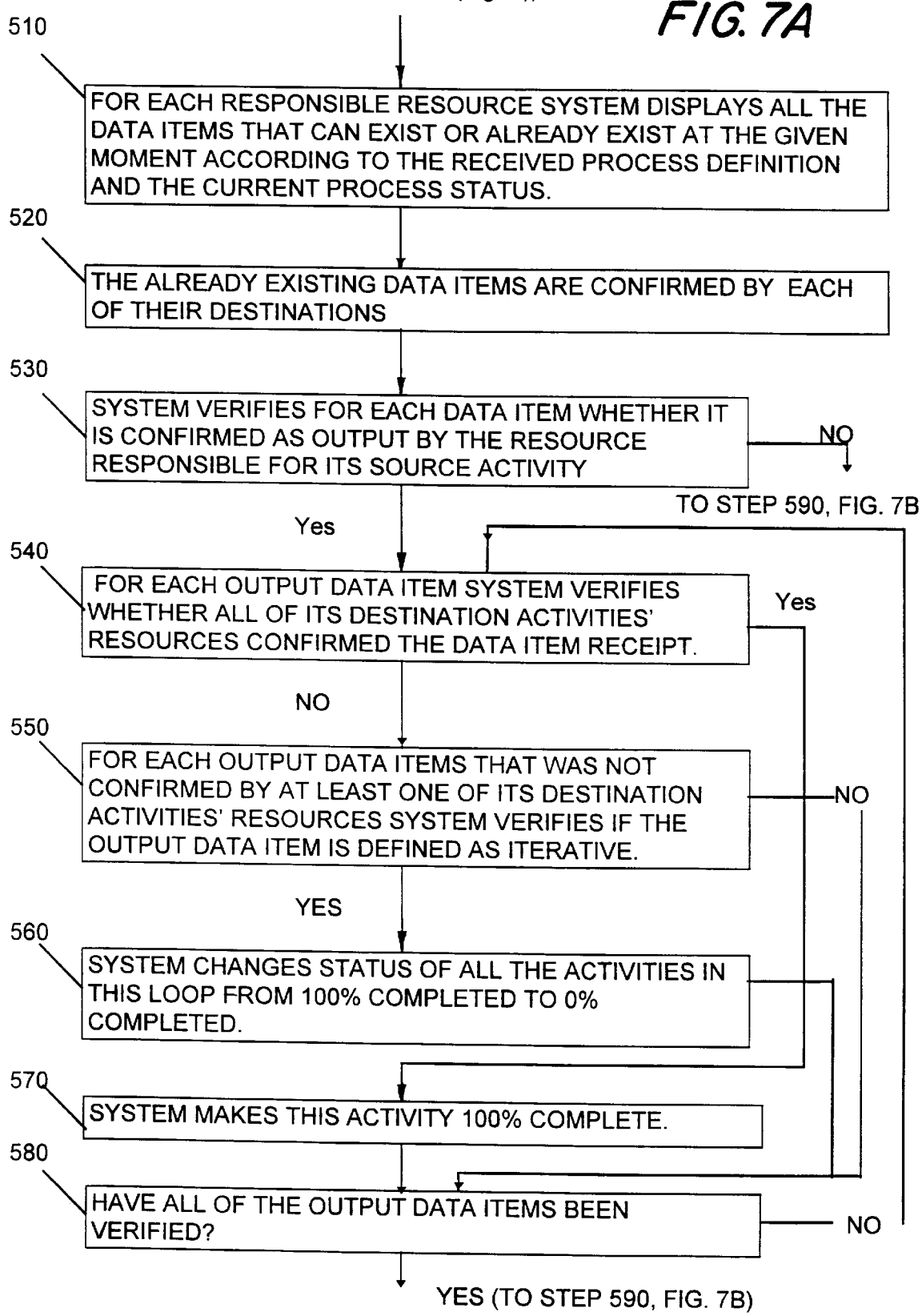

APPARATUS AND METHOD FOR DESIGNING AND PERFORMING A PROCESS SUCH AS A MANUFACTURING PROCESS

FIELD OF THE INVENTION

The present invention relates to apparatus and methods for designing and defining processes such as processes for manufacturing industrial products.

BACKGROUND OF THE INVENTION

Products which facilitate definition and design of processes, such as processes for manufacturing industrial products, are known.

The state of the art in this field, as best known by Applicant, is represented by the following publications:

Shapiro, B., Kapustnikov, A. "Problems of CAD technology development", Assembly of Kiev Cybernetics Institute, USSR Academy of Science, 1983 (in Russian).

Shapiro, B. "CAD/CAE system for general purpose. Structure, functions, application methods", Control Systems and Devices, No. 2, 1987 (in Russian)

Shapiro, B. "CAD technology model development and application". XII International Congress IKM, Weimar, Germany, 1990. (in Russian)

J. Corbett & J. A. J. Woodward, "A CAD-integrated "knowledge based system" for the design of die case components", Annals of the CIRP, 40/1/1991.

Suh, Nam P. and Sekimoto, Shinya, "Design of thinking design machine", Annals of the CIRP, 39/1/1990.

J. Encarnacao and E. G. Schlechtendahl, *Computer Aided Design: Fundamentals and system architectures*, Springer-Verlag, New York, 1983, especially pp. 37–81.

The disclosures of all publications mentioned in the specification and of the publications cited therein are hereby incorporated by reference.

SUMMARY OF THE INVENTION

The present invention seeks to provide an improved apparatus and method for designing and defining processes such as processes for manufacturing industrial products.

There is thus provided in accordance with a preferred embodiment of the present invention a method for designing and performing a process, the method including (a) generating a definition of the process, the generating step including (i) defining an output of the process, and (ii) defining a plurality of activities forming at least one sequence of activities which lead to the output, including defining complete information which includes, for each of the plurality of activities input information, including a source thereof, and output information, including a destination thereof, and (b) carrying out the process at least partly in accordance with the definition of the process.

Further in accordance with a preferred embodiment of the present invention the complete information is characterized in that carrying out the process in accordance with the complete information in the definition results in the output.

Still further in accordance with a preferred embodiment of the present invention the process includes at least a portion of a refinery manufacturing method.

Additionally in accordance with a preferred embodiment of the present invention the process includes constructing a refinery.

There is also provided in accordance with another preferred embodiment of the present invention a method for designing and performing a process, the method including (a) generating a definition of the process, the generating step including (i) prompting a user to define at least one task included in the process, and (ii) unless the user indicates that a constant number of executors are required to perform the at least one task, prompting the user to decompose the at least one task into activities until, for each of the activities, the user indicates that a constant number of executors are required to perform the activity, and (b) carrying out the process at least partly in accordance with the definition of the process.

There is also provided in accordance with another preferred embodiment of the present invention a method for designing and performing a process, the method including (a) generating a definition of the process, the generating step including (i) prompting a user to define at least one task included in the process, and (ii) unless the user indicates that an increased number of executors of the task does not substantially reduce time required to perform the task, prompting the user to decompose the at least one task into activities until, for each of the activities, the user indicates that an increased number of executors of the activity does not substantially reduce time required to perform the activity, and (b) carrying out the process at least partly in accordance with the definition of the process.

There is also provided in accordance with another preferred embodiment of the present invention a method for designing and performing a process, the method including (a) generating a definition of the process, the generating step including (i) accepting a user's definition of at least one task included in the process and of at least one input data items for the task, and (ii) unless the user indicates that each of the at least one input data items are required to start the task, prompting the user to decompose the at least one task into activities and to define at least one input data item for each of the activities, until, for each of the activities, the user indicates that each of its input data items are required to start the activities, and (b) carrying out the process at least partly in accordance with the definition of the process.

There is also provided in accordance with another preferred embodiment of the present invention a method for designing and performing a process, the method including (a) generating a definition of the process, the generating step including (i) prompting a user to define an output of the process, and (ii) prompting a user to define of a plurality of activities forming at least one sequence of activities which lead to the output, including defining input information items for at least some of the activities and output information items for at least some of the activities, (b) analyzing the definition, providing a prompt to the user when a source is not defined from among the activities or from external sources for at least one of the input information items, and providing a prompt to the user when a destination is not defined from among the activities and/or output of the process for at least one of the output information items, and (c) carrying out the process at least partly in accordance with the definition of the process.

There is also provided in accordance with another preferred embodiment of the present invention a method for designing and performing a process, the method including (a) generating a definition of the process, the generating step including (i) prompting a user to define a plurality of activities included in the process, (ii) prompting a user to define a plurality of data items which serve as inputs and outputs to individual activities from among the plurality of activities, (iii) prompting the user to optionally define one or more of the plurality of data items as iterative, and (iv) if the user elects to define at least one data item having at least one destination initiating activities as iterative, prompting the user to define a loop initiating activity and a process generator operative to generate a loop which includes the data item and to define an exit point from the loop, and (b) carrying out the process in accordance with the definition of the process, including prompting the user to reperform the loop if the iterative data item is not confirmed by at least one of its destination activities.

Further in accordance with a preferred embodiment of the present invention the iterative data item is generated by a source activity and the loop includes a looped sequence of activities included first and last activities and the last activity is the source activity for the iterative data item and the if-prompting step includes prompting the user to select a selected activity from among activities preceding the source activity and to define the selected activity as the loop's first activity and as a destination activity for the iterative data item.

There is also provided in accordance with another preferred embodiment of the present invention a method for designing and performing a process, the method including (a) generating a definition of the process, the generating step including (i) prompting a user to define a plurality of activities included in the process, and (ii) prompting a user to define a plurality of data items which serve as inputs and outputs to individual destination and source activities, respectively, from among the plurality of activities, external sources and/or output of the process and (b) carrying out the process in accordance with the definition of the process, the carrying out step including (i) obtaining confirmation of each data item at least from each destination activity thereof from among the plurality of activities, (ii) starting each individual activity from among the plurality of activities only when, for each individual data item from among all input data items for the individual activity, all destination activities of the individual data item have confirmed the individual data item.

Further in accordance with a preferred embodiment of the present invention the method also includes defining an individual activity as complete only when each individual data item from among all output data items for the individual activity has been confirmed.

There is also provided in accordance with another preferred embodiment of the present invention a method for designing a process, the method including prompting a user to define at least one task included in the process, and unless the user indicates that a constant number of executors are required to perform the at least one task, prompting the user to decompose the at least one task into activities until, for each of the activities, the user indicates that a constant number of executors are required to perform the activity.

There is also provided in accordance with another preferred embodiment of the present invention apparatus for designing a process, the apparatus including a process definition generator operative to generate a definition of the process, the generator being operative (i) to prompt a user to define at least one task included in the process, and (ii) unless the user indicates that an increased number of executors of the task does not substantially reduce time required to perform the task, to prompt the user to decompose the at least one task into activities until, for each of the activities, the user indicates that an increased number of executors of the activity does not substantially reduce time required to perform the activity.

There is also provided in accordance with another preferred embodiment of the present invention a method for designing a process, the method including (i) prompting a user to define at least one task included in the process and of at least one input data items for the task, and (ii) unless the user indicates that each of the at least one input data items are required to start the task, prompting the user to decompose the at least one task into activities and to define at least one input data item for each of the activities, until, for each of the activities, the user indicates that each of its input data items are required to start the activities.

There is also provided in accordance with another preferred embodiment of the present invention apparatus for designing a process, the apparatus including (a) a process definition generator operative to generate a definition of the process, the generator being operative (i) to prompt a user to define an output of the process, and (ii) to prompt a user to define a user to define a plurality of activities forming at least one sequence of activities which lead to the output, including prompting a user to define input information items for at least some of the activities and output information items for at least some of the activities, and (b) a definition analyzer operative to provide a prompt to the user when a source is not defined from among the activities or external sources for at least one of the input information items, and to provide a prompt to the user when a destination is not defined from among the activities and/or process output for at least one of the output information items.

There is also provided in accordance with another preferred embodiment of the present invention apparatus for designing and performing a process, the apparatus including (a) a process definition generator operative to generate a definition of the process, the generator being operative (i) to prompt a user to define a plurality of activities included in the process, (ii) to prompt a user to define a plurality of data items which serve as inputs and outputs to individual activities from among the plurality of activities, (iii) to prompt the user to optionally define one or more of the plurality of data items as iterative, and (iv) if the user elects to define at least one data item having at least one destination activities as iterative, to prompt the user to define a loop initiating activity and a process generator operative to generate a loop which includes the data item and to define an exit point from the loop, and (b) process performing apparatus operative to carry out the process in accordance with the definition of the process, including prompting the user to reperform the loop if the iterative data item is not confirmed by at least one of its destination activities.

There is also provided in accordance with another preferred embodiment of the present invention apparatus for designing and performing a process, the apparatus including (a) a process definition generator operative to generate a definition of the process, the generator being operative to (i) prompt a user to define a plurality of activities included in the process, and (ii) prompt a user to define a plurality of data items which serve as inputs and outputs to individual destination and source activities, respectively, from among the plurality of activities, external sources and/or process outputs, (b) process performing apparatus operative to carry out the process in accordance with the definition of the process, the process performing apparatus including (i) data item confirmation apparatus operative to obtain confirmation of each data item at least from each destination activity thereof from among the plurality of activities, and (ii) an activity initiator operative to start each individual activity from among the plurality of activities only when, for each individual data item from among all input data items for the individual activity, all destination activities of the individual data item have confirmed the individual data item.

BRIEF DESCRIPTION OF THE DRAWINGS

The present invention will be understood and appreciated from the following detailed description, taken in conjunction with the drawings in which:

FIGS. 2A, 2B and 2C, taken together, form a simplified flowchart illustration of a preferred method and system, constructed and operative in accordance with a preferred embodiment of the present invention, for analyzing user-defining process information, identifying incompleteness therein, and prompting a user to alleviate the incompleteness until the process information completely defines a process;

FIG. 3 is a simplified diagram of a process which has been decomposed into activities using the method of FIGS. 1–2C;

FIGS. 7A and 7B, taken together, form a simplified flowchart illustration of a preferred method for carrying out a process in accordance with a definition thereof generated in accordance with the method of FIGS. 1–4.

Attached herewith is the following appendix which aids in the understanding and appreciation of one preferred embodiment of the invention shown and described herein:

Appendix A is a computer listing of a preferred software implementation of the present invention.

DETAILED DESCRIPTION OF A PREFERRED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Figure 1:
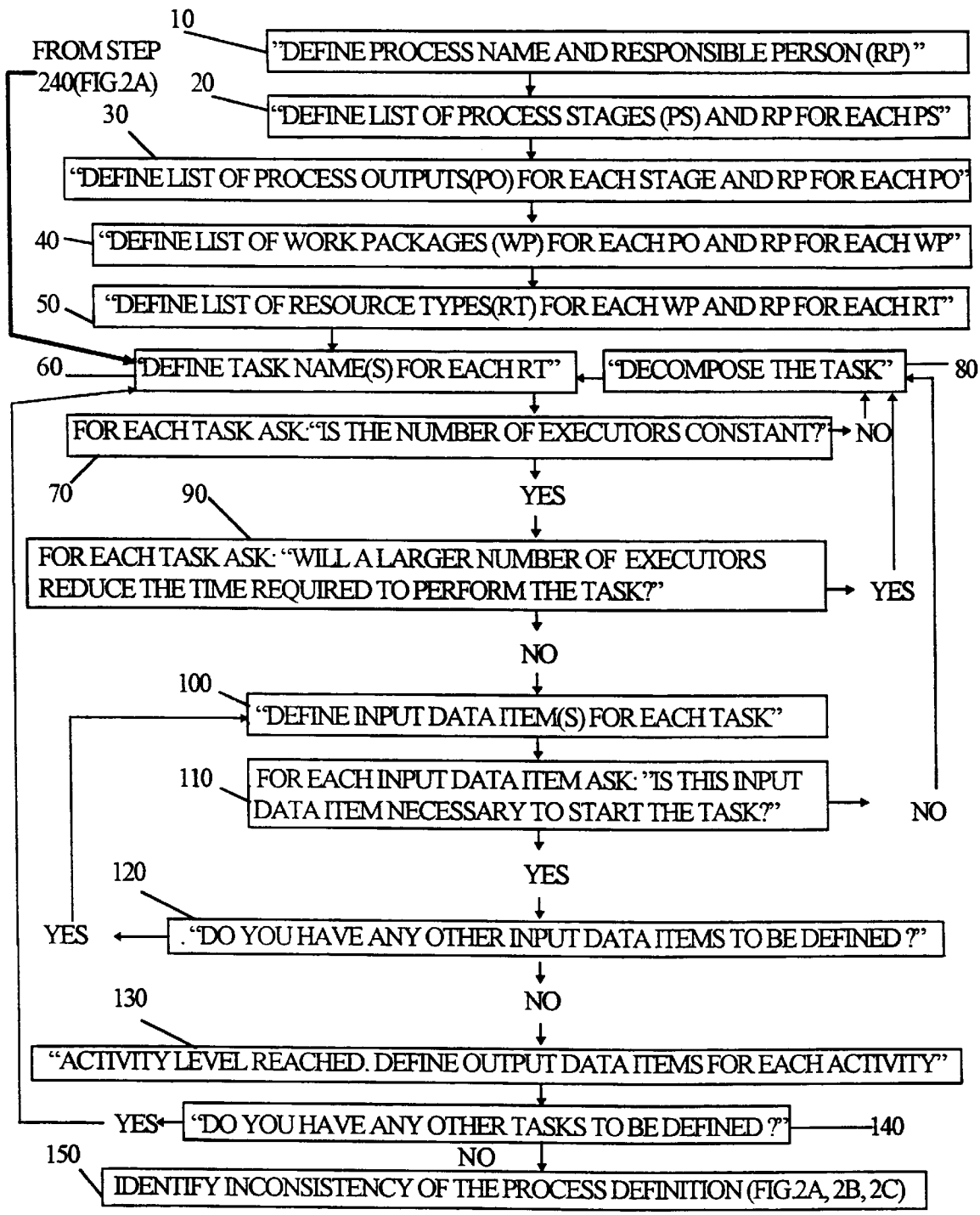
FIG. 1 is a simplified flowchart illustration of a preferred method or system for generating a definition of a top-down structure for a process such as an industrial manufacturing process.

Reference is now made to FIG. 1 which is a flowchart illustration of a preferred method or system for generating a definition of a top-down structure for a process to be carried out. In the flowchart illustration of FIG. 1, steps appearing in quotation marks (") are steps in which a prompt, whose contents is similar to the contents enclosed in quotation marks, is displayed to the user. Steps not appearing in quotation marks are carried out by the system itself.

The method of FIG. 1 preferably includes the following steps:

STEP 10: The user is prompted to define the name of the process to be defined and the person responsible for the process. The information provided by the user is accepted and stored.

STEP 20: Optionally, the user is prompted to list one or more stages in the process and, optionally, to designate a person responsible for further definition of each stage. The information provided by the user is accepted and stored.

STEP 30: For each stage defined by the user in step 20, the user is prompted to list one or more process outputs (outputs which the process is designed to produce) generated by that stage and to designate a person responsible for each process output. The information provided by the user is accepted and stored.

STEP 40: For each process output defined by the user in step 30, the user is optionally prompted to list one or more work packages which are useful in generating that process output. The user is also optionally prompted to designate a person responsible for further definition of each work package. The information provided by the user is accepted and stored.

STEP 50: For each work package defined by the user in step 40, the user is optionally prompted to list one or more resource types to be employed in performing that work package. The user is also prompted to designate a person responsible for or embodying each resource type. The information provided by the user is accepted and stored. The term "resource type" may refer to a human resource type, such as a type of engineer (mechanical, electrical, software, thin film, electrical testing, etc.) or a type of equipment resource (such as a type of computer or packaging machine).

STEP 60: For each resource type defined by the user in step 50, the user is prompted to name one or more tasks which are performed by that resource type. The information provided by the user is accepted and stored.

Preferably, the system now operates to prompt the user to decompose each task until each task has been decomposed into "activities". An activity is a task which fulfills the following criteria:

a. The number of executors required to perform the task is constant throughout the task;

b. Increasing the number of executors does not reduce the time required to perform the task; and c. Each input data item required to perform the task is required at the start of the task, rather than at some time after the task has been started.

In the illustrated embodiment, decomposition of each task into activities is effected by performing the following steps 70–120, for each task. The task currently being decomposed is termed herein "the current task".

STEP 70: The user is asked whether or not the number of executors of the current task (i.e., resources employed to perform the current task) is constant throughout execution of the task. If not, i.e. if some portions of the current task require more executors than other portions of the current task, then the current task does not qualify as an activity and each portion of the current task should be defined by the user as a new task. These portions may or may not qualify as activities. Therefore, if the user answers "no" in step 70, the user is prompted to decompose the current task (STEP 80). If the user answers "yes" in step 70, the current task is examined for adherence to the second criterion (STEP 90).

STEP 80: The user is prompted to "decompose the task", i.e. to break up the task into one or more tasks and to give a name to each such task. The information provided by the user is accepted and stored.

STEP 90: The user is asked whether or not a larger number of executors of the current task would reduce the amount of time required to perform the current task. If so, i.e. if a larger number of executors would reduce the required time, then the current task does not qualify as an activity and the portions of the current task that could be split off and assigned to additional executors should be defined by the user as new tasks. These portions may or may not qualify as activities. Therefore, if the user answers "yes" in step 90, the user is prompted to decompose the current task (STEP 80). If the user answers "no" in step 90, the current task is examined for adherence to the third criterion (STEPs 100 and 110).

STEP 100: The user is prompted to define at least one input data item for the current task or to select an existing input data item from among a plurality of input data items displayed to him by the system. The information provided by the user is accepted and stored. Preferably, the input data item is added to a list of data items (unless it is already present on that list) which stores, for each data item, a name, a source and a destination thereof. The current task is designated as the destination of the data item. Preferably, the list of data items includes all data items defined by the user and any other persons defined as responsible persons within the process and the list of data items is displayed to the user as he is prompted to list an input data item for the current task.

STEP 110: The user is asked whether or not each of the input data items defined in step 100 is necessary to start the current task. If not, i.e. if at least one input data item is only required when a portion of the current task has already been completed, then the current task does not qualify as an activity and the portions of the current task before and after the required "entry point" of each input data item should be separately defined by the user as separate tasks. These portions may or may not qualify as activities. Therefore, if the user answers "no" in step 110, the user is prompted to decompose the current task (STEP 80). If the user answers "yes" in step 110, the current task has been found to adhere to all three activity-defining criteria.

STEP 120: Preferably, the user is asked whether he has forgotten to define any input data items. If so, he is returned to step 100. If not, the system continues to step 130.

STEP 130: At this point, all tasks have been decomposed into activities. The user is now prompted to define at least one output data item for each activity or to select an existing input data item from among a plurality of these displayed to him by the system. Preferably, the list of data items is displayed to the user as he is prompted to select an output data item for the current task. The list typically comprises only those data items which lack a source whereas data items for which a source has already been defined are not displayed. The information provided by the user is accepted and stored.

Preferably, the output data item is added (unless it already appears) to the above-described list of data items which stores, for each data item, a name, a source and a destination thereof. The current task is designated as the source of the data item.

STEP 140: Preferably, the user is again asked whether he has forgotten to define any tasks. If so, he is returned to step 60. If not, the system continues to step 150. It is appreciated that steps 120 and 140 are optional steps in which the user can double-check his work. Similar steps can be added at appropriate points to ensure that the user has not forgotten to define elements other than input data items and tasks.

STEP 150: The process as defined by the user in the preceding steps is analyzed to identify incompletenesses therein, preferably as described in detail below with reference to FIGS. 2A–2C. Analyzing for incompleteness of a process definition preferably includes analyzing for existence of one or more of the following problems:

a. At least one data item lacks a source and/or a destination;

b. At least one process output is not an output data item of any of the activities in the process; and c. At least one loop has an undefined exit point.

A "loop" is a user-defined sequence of at least one activities wherein the last activity in the sequence has an output data item which is defined by the user as "iterative". A "sequence" of activities is a single activity or alternatively an ordered plurality of activities arranged such that the output data item of the nth activity comprises an input data item of the (n+1)th activity.

A correctly defined iterative output data item has at least two destinations, one of which is the first activity in the sequence and the other (one or more) of which is/are termed the "exit point/s" of the loop.

As described in more detail below with reference to FIG. 7, if a loop is defined and the iterative output data item is not confirmed by at least one of its destination activities, the iterative output data item returns as an input data item to the first activity in the sequence. This allows the first activity and subsequently, all subsequent activities in the loop, to be reperformed until the iterative output data item does meet the requirements. When this occurs, the iterative output data item is forwarded to its second destination, i.e. to the exit point of the loop.

Preferably, as described in detail below with reference to FIG. 2A, if a user defines a data item as iterative, the system displays a list of candidate activities which could serve as first activities in a loop for the iterative data item. These candidate activities include all activities defined thus far which are located "before" the source activity of the data item which is, of course, the last activity in the activity sequence of the loop. In other words, the activities displayed include all activities which are "upstream" of the activity whose output data item is the iterative data item. The terms "before" and "upstream" characterize activities which can be performed before the last activity in the activity sequence because they, and the activities "upstream" of them, do not require any output data item of the last activity nor any output data item of any activity "downstream" of the last activity.

The user is prompted to select a destination for the iterative data item, from among the displayed activities. The activity selected as destination is defined as the first activity in the activity sequence defining the loop.

The output of the method of FIG. 1 is a top-down structure including a process having outputs and a plurality of activities which directly or indirectly generate these outputs.

Figure 2C:
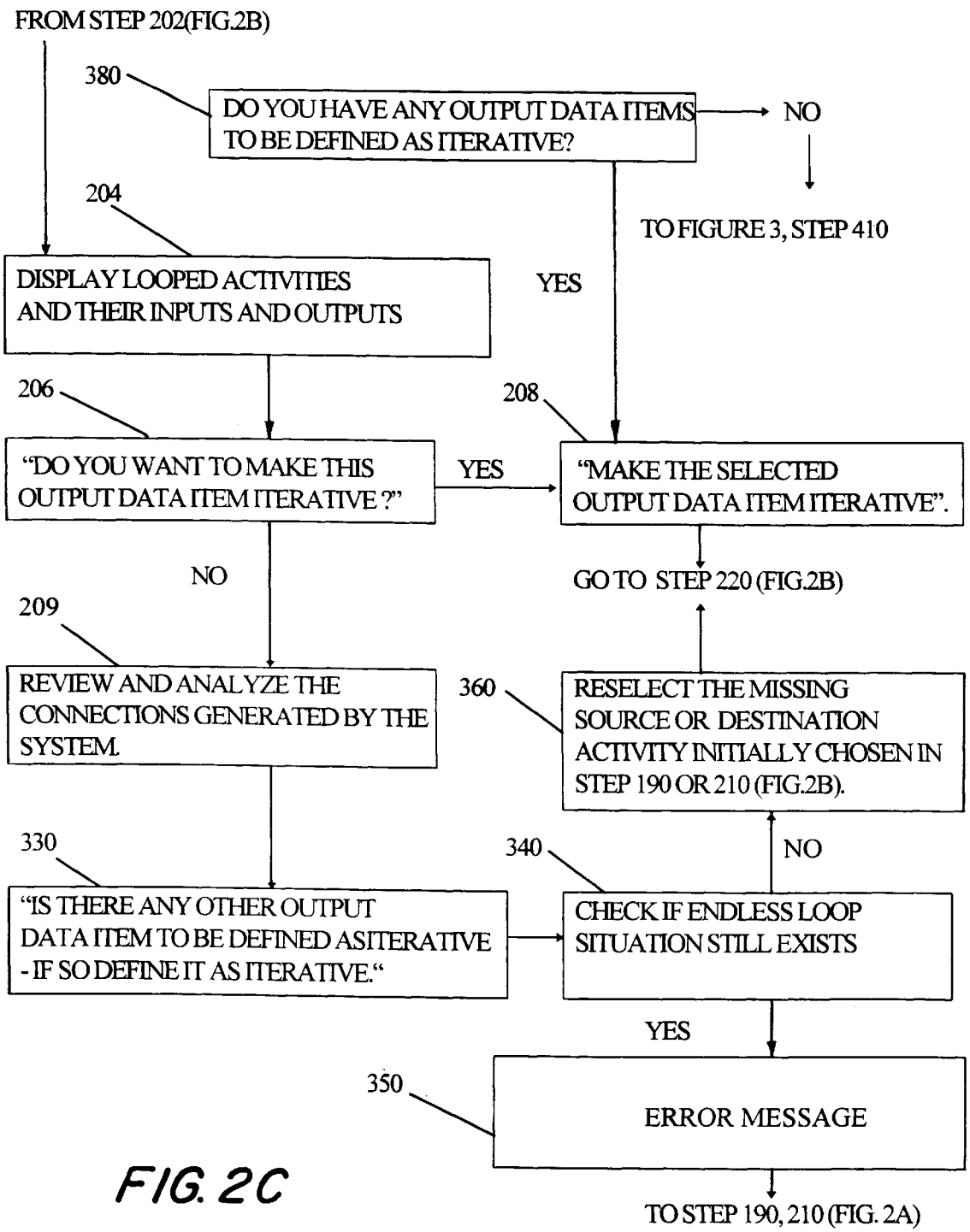

Reference is now made to FIGS. 2A–2C which, taken together, form a flowchart illustration of a preferred method and system to analyze user-defined process information, and to iteratively identify incompletenesses therein, and to prompt a user to eliminate each identified incompleteness, until the user-defined process information fully and completely defines a process.

The method and system of FIGS. 2A–2C preferably include the following elements. Preferably, the following elements are provided separately for each user of the system, i.e. for each person defined as a "responsible person" within a current process.

STEP 160: The system reviews the list of data items defined by the user to determine whether there are any data items which lack either a source or a destination or both. Often, at least some of the data items which the user defined as input data items will lack a source and at least some of the data items which the user defined as output data items will lack a destination. For each "lacking" data item, STEP 170: The user is prompted to select an appropriate source or destination. According to a preferred embodiment of the present invention, if the data item is missing a source, the user first merely selects one of the following: ONE OF MY ACTIVITIES, EXTERNAL SOURCE, ANOTHER RESPONSIBLE. If the data item is missing a destination, the user first merely selects one of the following: ONE OF MY ACTIVITIES, PROCESS OUTPUT, ANOTHER RESPONSIBLE.

STEP 180: This step is reached if the user selects ONE OF MY ACTIVITIES, indicating that one of the activities defined by the user is responsible for providing the data item (if the source is missing) or that the user intends to use the data item for one of his activities (if the destination is missing). In step 180, typically, the activities defined by the user as his responsibility (i.e. those activities which have been defined within work packages for which that user is designated as the Responsible Person) are displayed and the user is asked whether the activity (or activities) which comprise the missing source or destination appear on the list. If so, STEP 190: and if the data item's missing component is its destination, the user is prompted to select an activity or activities which are to be the data item's destination/s. This information is stored in the list of data items.

If (STEP 200) the user indicates that the data item is necessary at the beginning of the task, then STEP 202—the system determines whether definition of the data item's destination/s generates an endless loop because the destination of the current task's data item has been defined as an input item for an "earlier" task. If so, either one of the output data items in the loop must be defined as iterative, or the input and output data items are improperly defined and must be redefined to eliminate the loop. Therefore, the system displays the loop (STEP 204), and prompts the user to define the selected data output data item iterative, if he so desires (STEPS 206 and 208). If he does not so desire, the user is prompted to change the connections within the loop if he so desires (STEP 209) and/or to define at least one of the output data items in the loop as iterative if he so desires (STEP 330). The system then checks if the endless loop situation still exists (STEP 340), in which case the user is given an error message (STEP 350) and returned either to step 190 or to step 210 of FIG. 2A, as appropriate. If the endless loop no longer exists, the user is prompted to reselect the missing destination activity initially selected in step 190 (STEP 360) and the system returns to step 220 of FIG. 2B.

If definition of the data item's destination/s does not generate an endless loop, STEP 220—The data item is defined as an input data item for each of the selected destination activities and the system returns to step 160.

If (STEP 200) the user indicates that the data item is not necessary at the beginning of the task, STEP 230—the user is guided through further decomposition of the task by returning the user to step 80 of FIG. 1.

STEP 210: If a source is missing and the user indicates (step 180) that one of the activities already in the system comprises that source, then the user is prompted to select the activity, from among those already in the system, which is to be the data item's source.

The selected data item/s are defined as output data items for the selected source activity (STEP 220) and are defined as sources of the current data item. The system then returns to step 160.

STEP 240: If, in answer to the prompt of step 180, the user responds that the missing source or destination is not any of the activities defined so far with himself as the Responsible Person, then apparently the user has failed to define some of his own activities. The user is preferably asked which level of FIG. 1 (stage level, process output level, work package level, resource type level, work package level) he wishes to enter to define the missing activities, and he is then guided through the system of FIG. 1 at the level he has selected.

STEP 260: If, in step 170, the user indicates that a missing source is "external", this means that a particular data item is to be provided from a source external to the process rather than as an output of one of the process's activities. In this case, whichever external sources have already been defined, if any, are displayed, and the user is asked whether one of the external sources already defined is an appropriate for the current source-deficient data item. If so, STEP 270: The user is prompted to select a source for the source-deficient data item from the available external source.

STEP 280: If the user answers "no" to the prompt of step 260, the user is prompted to define a new external source which is defined as the source of the source-deficient data item and that data item is stored as a required output for that external source. The system then returns to step 160.

STEP 290: If, in response to the prompt of step 170, the user indicates that the current data item, which is destination-deficient, is part of the output of the process, this information is stored and the output data item is designated as a part of the process output.

STEP 300: If, in response to the prompt of step 170, the user indicates that a Responsible Person other than himself is responsible for the missing source/destination of the current data item, a list of the Responsible Persons defined within the process are displayed to the user and the user is prompted to select the appropriate Responsible Person. The current data item is then assigned a flag indicating that a particular Responsible Person must review it and that Responsible Person is preferably returned to step 170 of the system.

Figure 4:
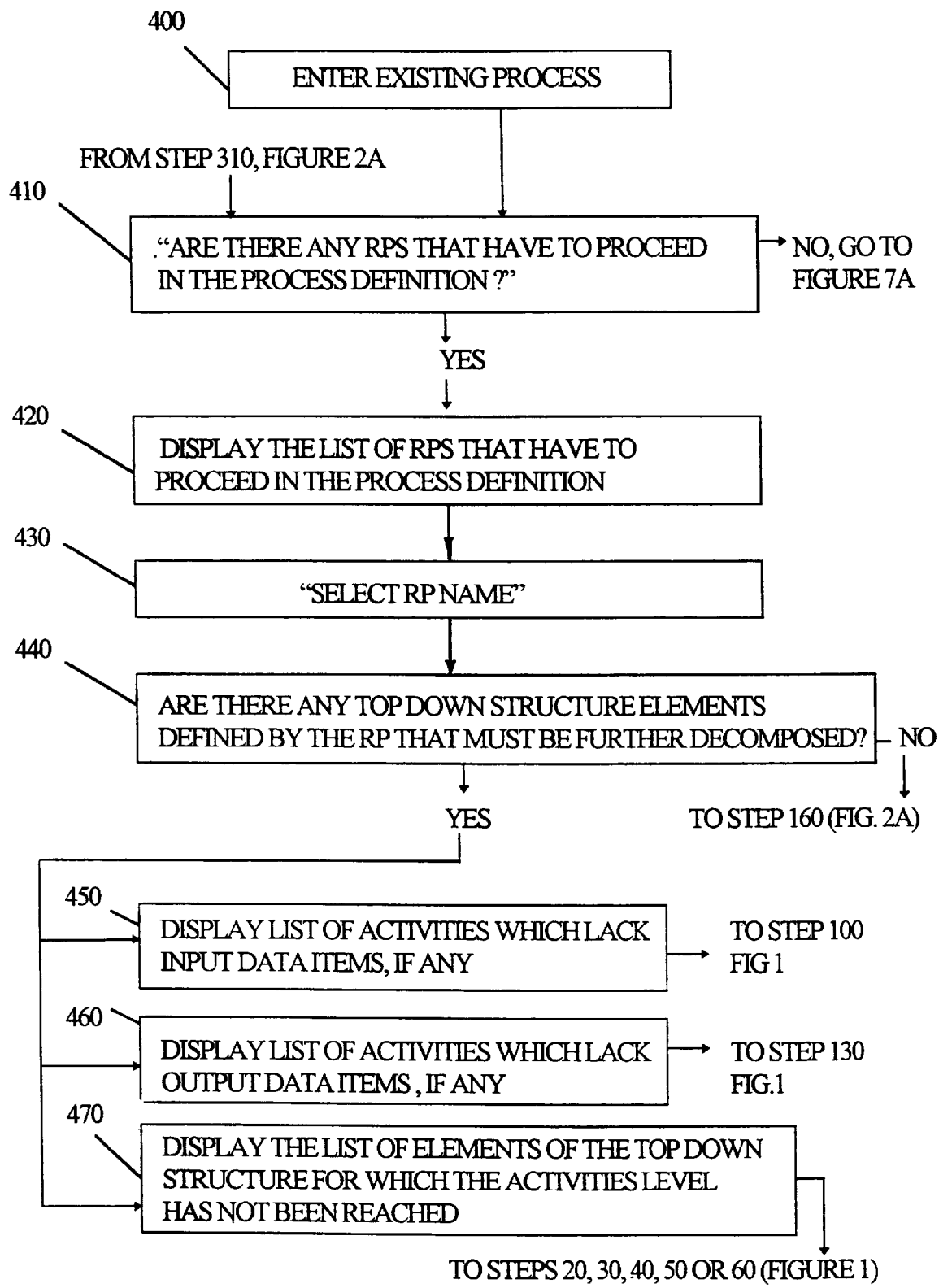
FIG. 4 is a simplified flowchart illustration of a preferred method and system for presenting only relevant portions of the process-defining system of FIGS. 1–2C to each of a plurality of responsible persons each having previously been defined as responsible for only a portion of the process being defined.

STEP 310: Typically, after sources and destinations have been defined for all source- and/or destination-deficient data items, the system checks whether there are any loops with undefined exit points. If all loops have exit points, the method ends or the system tries to identify responsible persons who have not yet completed their portion of the process definition (FIG. 4, step 410). Otherwise, for each loop which lacks an exit point, STEP 320: The loop's final activity is displayed to the user. The method then returns to step 170 to allow the user to select a destination for the output data item of the loop's final activity which can serve as an exit point. Reference is made briefly to FIG. 3 which is a diagram of a process which has been decomposed into activities. In FIG. 3, activities are indicated in boldface, data items are indicated as letters (A, B, C, . . . ), broken-line arrows indicate entry points of input data items, such as W, U and A, which are provided by external information sources rather than being generated as output data items of activities, and short broken-line arrows indicate exit points of output data items, such as F, O and N, which comprise process output. An example of a loop in FIG. 3 is the sequence of activities 5 and 9, because data item N, which is an output data item of activity 9, is returned to activity 5 as an input data item if N does not meet requirements. If N does meet requirements, it is accepted as part of the process output and also serves as an input data item to activity 8.

Reference is now made to FIG. 4 which is a simplified flowchart illustration of a preferred method and system for presenting only relevant portions of the process-defining system of FIGS. 1–2C to each of a plurality of responsible persons each having previously been defined as responsible for only a portion of the process being defined.

Once at least step 10 of FIG. 1 has been performed, at least one Responsible Person has already been defined. Therefore, subsequently, the system of FIGS. 1 and 2C is preferably entered via the system of FIG. 4.

The system of FIG. 4 preferably performs the following steps:

STEP 400: An existing process is entered, typically after prompting the user to indicate a process name.

STEP 410: Preferably, the system constantly determines whether there are any responsible persons having at least one item which still requires decomposition, includes an endless loop or is otherwise improperly or incompletely defined. If there are such responsible persons, STEP 420: the item which is improperly or incompletely defined is displayed to that responsible person.

STEP 430: The user (responsible person) is prompted to select one of the Responsible Persons on the list.

STEP 440: The system determines whether that Responsible Person has successfully moved through the system and method of FIG. 1. For example, if at least one process output is not an output data item of any of the activities in the process, the method of FIG. 1 has not been successfully completed.

STEP 450: If the system identifies at least one activity defined by the Responsible Person which is input-data-item deficient, then all input-data-item deficient activities are displayed and the user is prompted to select one of these at a time and to remedy their deficiencies, by returning repeatedly, as necessary, to step 100 of FIG. 1.

STEP 460: If the system identifies at least one activity defined by the Responsible Person which is output-data-item deficient, then all output-data-item deficient activities are displayed and the user is prompted to select one of these at a time and to remedy their deficiencies, by returning repeatedly, as necessary, to step 130 of FIG. 1.

STEP 470: If the system identifies at least one top-down structural item (process stage, process output, work package, resource or task) which has not been decomposed into activities, then all such items are displayed and the user is prompted to select one of these at a time and is returned to the appropriate step of FIG. 1 (steps 20, 30, 40, 50 or 60).

Figure 7B:
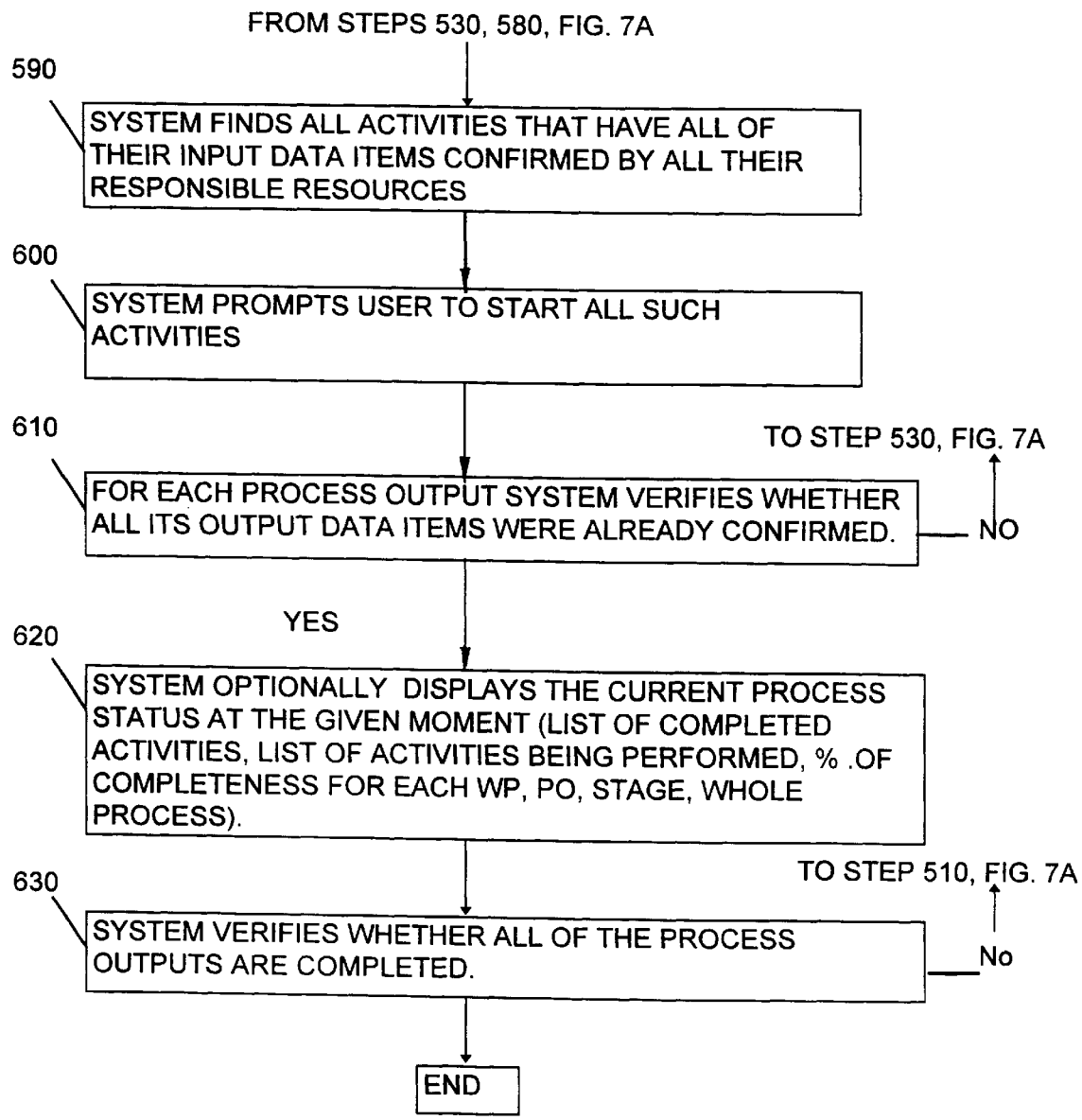

FIGS. 7A and 7B, taken together, form a simplified flowchart illustration of a preferred method for carrying out a process in accordance with a definition thereof generated in accordance with the method of FIGS. 1–4.

The method of FIGS. 7A–B is generally self-explanatory except for the following information:

"Process status" refers to the extent to which a process has been completed, typically including a completed/not completed indication for each activity in the process and a confirmed/not confirmed indication for each data item generated.

Confirmation of each data item is provided generally by at least all destination activities for that data item and preferably also by the source activity which generated the data item.

In step 510, the system preferably displays an indication, for each displayed data item, of whether that data item already exists, or, conversely, whether it "can exist", i.e. is an output data item of an activity which requires a plurality of input data items each of which already exists or has already been received from an external source.

Appendix A is a computer listing of a preferred software implementation of the present invention. The following is a description of how Appendix A can be employed to create a preferred software implementation of one embodiment of the present invention:

a. Install a Borland C++ 3.1 compiler on a computer, in accordance with the method described in the Borland C++ 3.1 user's manual.

b. Create a project root directory:
c:\>md iceroot <ENTER> c. Under the "iceroot" directory, create:
c:\iceroot>md analyst <ENTER>
c:\iceroot>md include <ENTER>
c:\iceroot>md lib <ENTER> d. Under the "analyst" directory, create:
c:\iceroot\analyst>md sources <ENTER> e. Put the "include" files of Appendix A into the c:\iceroot\include directory.

f. Put the lib file (ICE_TBCL.LIB) file into the c:\iceroot\lib directory g. Put the source files in the c:iceroot\analyst\sources directory.

h. From the c:\iceroot\analyst\sources directory run the Borland C++3.1 compiler:
c:iceroot\analyst\sources>bc <ENTER> i. From the Project menu, choose the "open project" option j. In the "open project file" box, type: ANALYST.PRJ and press <ENTER>.

k. Press INS to get the "add to project list" dialog box.

l. Add all the .C files of Appendix A to the project.

m. Add the ..\..\lib\ice_ttbcl.lib file to the project and press "done".

n. From the option menu, choose "directories".

o. In the "include directories" box, type:
c:\borlandc\include;c:\borlandc\include\sys;..\..\include;.

p. In the "library directories" box, type:
c:\borlandc\lib q. From the "compile" menu, choose the "build all" option.

r. Once the ANALYST.EXE file has been created, create a directory called PROJECT1. Under the PROJECT1 directory, create WORK and BACKUP directories. Under the PROJECT1 directory, put ANALYST. EXE.

s. Under the PROJECT1 directory, create a text file PROJECT1.PAR as follows:
c:\project1\work\project1
c:\project1\project1.err
c:project1\backup\project1 t. In the DOS prompt, while in the PROJECT1 directory, open ANALYST's first screen by typing:

ANALYST.EXE PROJECT1.PAR and press <ENTER>

An example of an application of the present invention in which the methods and apparatus described above are employed in a refinery creation process are shown and described herein.

EXAMPLE: REFINERY

A refinery designing process is first generated, on the basis of which the refinery is constructed. The methods and apparatus described above may be employed to implement the refinery designing process and/or to implement the construction of the refinery in accordance with the refinery designing process. For simplicity, what is described in detail herein is only an application of the invention shown and described herein to a process engineering portion of the refinery designing process. It is appreciated that the remaining steps in designing and constructing a refinery may be carried out by similarly employing the present invention and methods known in the oil-refining art.

In the present example, the process was defined by four "responsible persons": Oded, Eliahu, John and Danuta. Oded defined a process named "refinery" and also defined a stage named "process engineering". Process engineering was decomposed by Eliahu, who defined the following process outputs: PFD (process flow diagram), P&ID (process instrumentation diagram), M&E BAL (material and equipment balance data sheets), EQUIP LIST (equipment list), LINES LIST (piping list), INST LIST (instrument list), MOTOR LIST, SP. IT. LIST (spare items list) and INTER LOCK DES.

The process which yields PFD was decomposed into work packages by John. All other items in the top-down structure of the process which yields PFD were defined by John except the "draw PFD" activity of FIG. 5 which was defined by Danuta.

Figure 5:
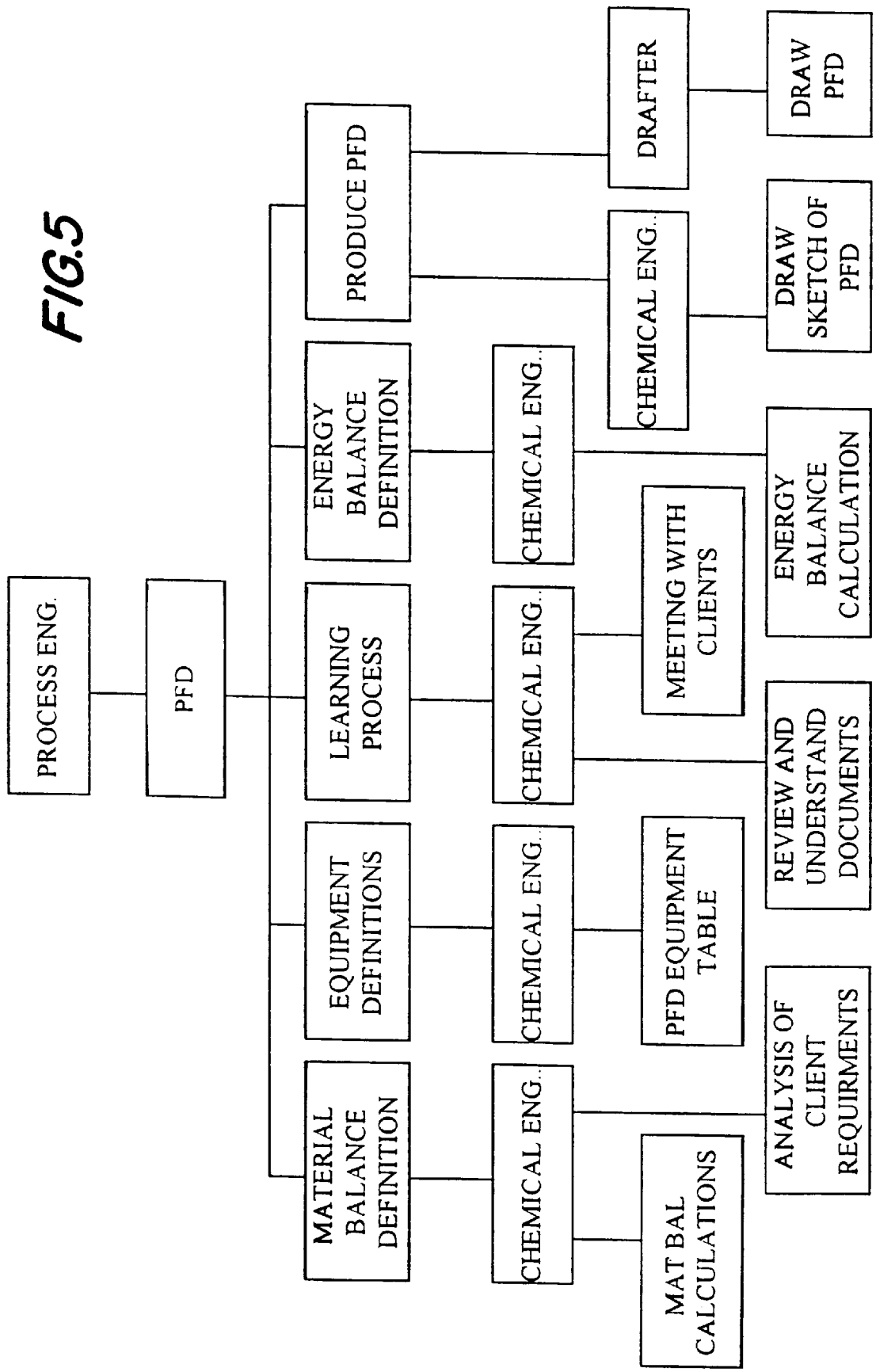
FIG. 5 is a top-down structure diagram of a sample process defined using the method of FIG. 1, steps 10–120.

FIG. 5 is a top-down structure diagram of the process which yields the process output named "PFD". This process yields two data items: a process flow diagram and a PFD equipment table.

Figure 6:
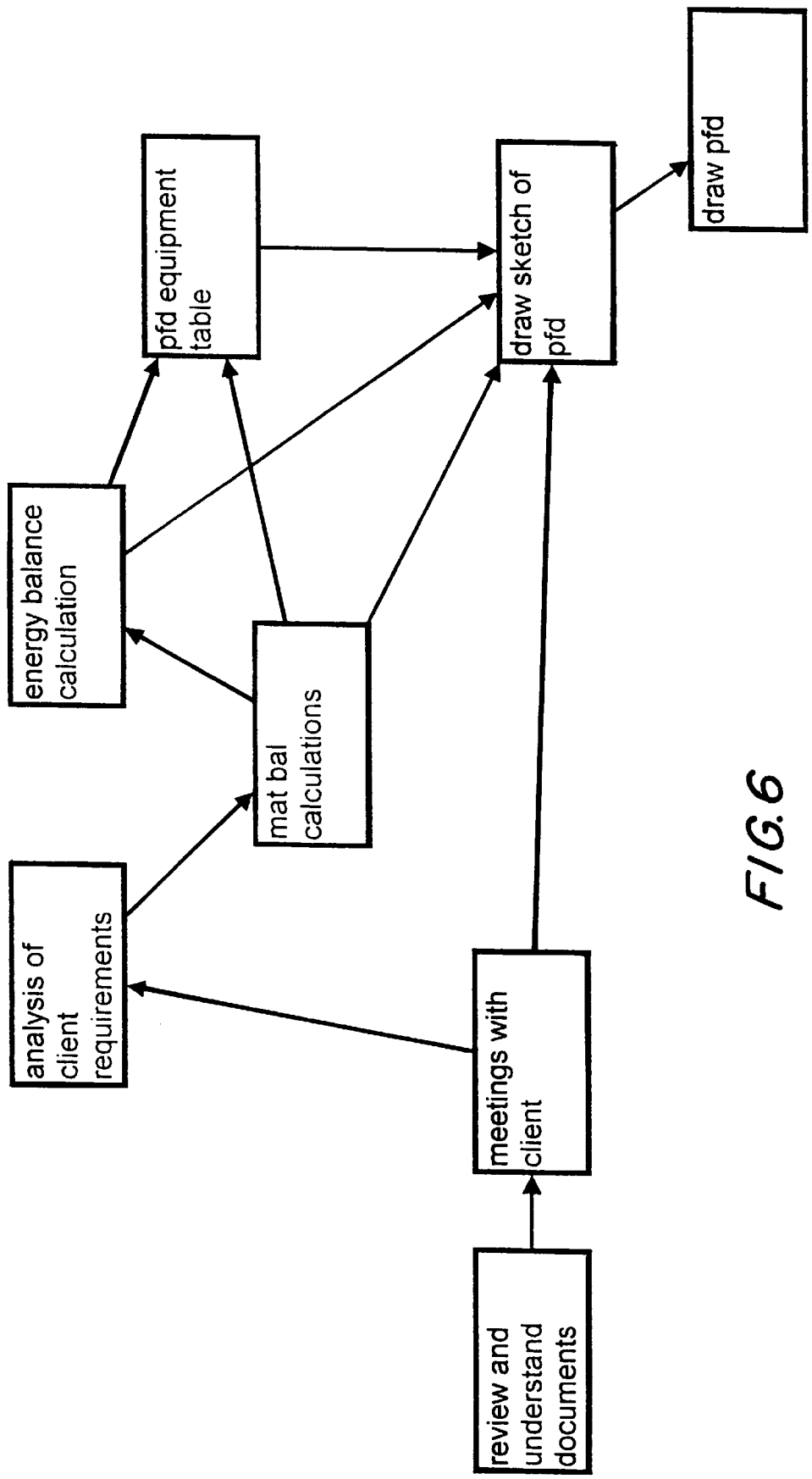
FIG. 6 is a diagram,of the input-output connections between eight activities defined in FIG. 5.

FIG. 6 is a diagram of the input-output connections between eight activities defined in FIG. 5, which connections were defined using the method of FIGS. 1 (steps 130–150), 2A–2C and 4.

The following external sources for the above process were defined:

1. In House Manual—containing the data item named "statistical data",
2. Manufacturer's Catalog—containing the data item named "thermodynamical properties", and
3. Client Requirements—containing the following data items: "scope of work", "design basis", "block diagram", "inlet stream compositions", "inlet stream flow rates", "inlet stream conditions", "energy users", "energy producers", and "general equipment list".

The data item "customer's requirements and clarifications" has been defined as iterative.

The following eight pages are "technological cards" which describe the 8 activities of FIG. 5, namely "analysis of client requirements", "meetings with client", "review and understand documents and basis of design", "mat bal calculations", "energy balance calculation", "PFD equipment table", "raw sketch of pfd", and "draw pfd". These "technological cards" are preferably computer-generated as an output of the method of the present invention. Each "technological card" includes some or all of the following information:

a. date of the printout,
b. information regarding the location of the activity in the process hierarchy, preferably including:
   name of the project, name of the stage in which the activity is included, name of the output data item to which the activity relates, name of the work package in which the activity is included, name of the task from which the activity emerged, name of the activity.
d. Status of the activity—active (now being performed), passive (not yet performed) or completed.
e. Schedule for the activity.
f. Names of input data items entering the activity and the source for each.
g. Names of output data items generated by the activity and a destination for each. "References" describes codes and abbreviations used to designate outputs, activities and external sources (reference documents and input documents).

The eight diagrams are as follows:

| Activity's Technological Card |
|---|

Date: 12/29/96
Project name: REFINERY
Stage name: process eng
Output name: pfd
Work package name: material balance definition
Task name: none
Activity name: analysis of client requirements
Activity status: Passive (Active \ Passive \ Completed)

| Key | Scheduling start | Scheduling finish | Duration | Cost |
|---|---|---|---|---|
| 51 | 12/3/95 | 13/3/95 | 5.00 | 0.00 |

| Input data | | | |
|---|---|---|---|
| Key | Name | Source | Control |
| 3 | block diagram | 1-inp. doc | |
| 24* | customer's requirements and clarifications | 43-activity | |
| 27 | general equipment list | 1-inp. doc | |

| Output data | | | |
|---|---|---|---|
| Key | Name | Destination | Control |
| 28 | detailed equipment list | 32-activity | |

| Workflow | |
|---|---|
| Key | Name |
| 5 | thorough analysis of all available information |

References:

Output

| Key | Name |
|---|---|
| none | none |

Activities

| Key | Name | Resource |
|---|---|---|
| 43 | meetings with client | lead eng. |
| 32 | mat bal calculations | eng. |

Reference documents

| Key | Name |
|---|---|
| none | none |

Input documents

| | Name |
|---|---|
| 1 | client requirement |

Expert:

Name: john
Division: process eng
Specialization: sen eng
Responsible:

-continued

Activity's Technological Card

Name: sen eng.
Division: process eng
Specialization: chemical eng.

Date: 06/04/96
Project name: REFINERY
Stage name: process eng
Output name: pfd
Work package name: learning process
Task name: none
Activity name: meetings with client
Activity status: Passive (Active \ Passive \ Completed)

| Key | Scheduling start | Scheduling finish | Duration | Cost |
|---|---|---|---|---|
| 43 | 24/1/95 | 24/1/95 | 4.00 | 0.00 |

Input data

| Key | Name | Source | Control |
|---|---|---|---|
| 25 | queries | 42-activity | |

Output data

| Key | Name | Destination | Control |
|---|---|---|---|
| 24* | customer's requirements and clarifications | 46-activity | |
| | | 51-activity | |
| | | 42-activity | |

Workflow

| Key | Name |
|---|---|
| 6 | meeting, receiving of additional info |

References:

Output

| Key | Name |
|---|---|
| none | none |

Activities

| Key | Name | Resource |
|---|---|---|
| 42 | review and understand documents and basis of design | sen eng. |
| 46 | draw sketch of pfd | des eng. |
| 51 | analysis of client requirements | sen eng. |

Reference documents

| Key | Name |
|---|---|
| none | none |

Input documents

| Key | Name |
|---|---|
| none | none |

Expert:

Name: john
Division: process eng
Specialization: sen eng
Responsible:

Name: lead eng.
Division: process eng
Specialization: chemical eng.

Date: 06/04/96
Project name: REFINERY

-continued

Activity's Technological Card

Stage name: process eng
Output name: pfd
Work package name: learning process
Task name: none
Activity name: review and understand documents and basis of design
Activity status: Passive (Active \ Passive \ Completed)

| Key | Scheduling start | Scheduling finish | Duration | Cost |
|---|---|---|---|---|
| 42 | 12/3/95 | 15/3/95 | 16.00 | 0.00 |

Input data

| Key | Name | Source | Control |
|---|---|---|---|
| 1 | scope of work | 1-inp. doc | |
| 2 | design basis | 1-inp. doc | |
| 3 | block diagram | 1-inp. doc | |
| 24* | customer's requirements and clarifications | 43-activity | |

Output data

| Key | Name | Destination | Control |
|---|---|---|---|
| 25 | queries | 43-activity | |

Workflow

| Key | Name |
|---|---|
| 5 | thorough analysis of all available information |

References:

Output

| Key | Name |
|---|---|
| none | none |

Activities

| Key | Name | Resource |
|---|---|---|
| 43 | meetings with client | lead eng. |

Reference documents

| Key | Name |
|---|---|
| none | none |

Input documents

| Key | Name |
|---|---|
| 1 | client requirement |

Expert:

Name: john
Division: process eng
Specialization: sen eng
Responsible:

Name: sen eng.
Division: process eng
Specialization: chemical eng.

Date: 12/29/96
Project name: REFINERY
Stage name: process eng
Output name: pfd
Work package name: material balance definition
Task name: none
Activity name: mat bal calculations
Activity status: Passive (Active \ Passive \ Completed)

| Key | Scheduling start | Scheduling finish | Duration | Cost |
|---|---|---|---|---|

-continued

Activity's Technological Card

| 32 | 26/1/95 | 10/2/95 | 95.00 | 0.00 |
|---|---|---|---|---|

Input data

| Key | Name | Source | Control |
|---|---|---|---|
| 8 | inlet stream compositions | 1-inp. doc | |
| 9 | inlet stream flowrates | 1-inp. doc | |
| 10 | inlet stream conditions | 1-inp. doc | |
| 28 | detailed equipment list | 51-activity | |

Output data

| Key | Name | Destination | Control |
|---|---|---|---|
| 11 | intermediate stream compositions | 46-activity | |
| 12 | outlet stream compositions | 39-activity | |
|  |  | 46-activity | |
| 13 | intermediate stream conditions | 40-activity | |
|  |  | 46-activity | |
| 14 | intermediate stream flowrates | 40-activity | |
|  |  | 46-activity | |
| 15 | outlet stream flowrates | 39-activity | |
|  |  | 40-activity | |
|  |  | 46-activity | |
| 16 | outlet stream conditions | 39-activity | |
|  |  | 40-activity | |
|  |  | 46-activity | |

Workflow

| Key | Name |
|---|---|
| 2 | input data and run chem-cad simulation, analyse results & perform overall balance |

References:

Output

| Key | Name |
|---|---|
| none | none |

Activities

| Key | Name | Resource |
|---|---|---|
| 51 | analysis of client requirements | sen eng. |
| 46 | draw sketch of pfd | des eng. |
| 39 | energy balance calculation | eng. |
| 40 | pfd equipment table | des eng. |

Reference documents

| Key | Name |
|---|---|
| none | none |

Input documents

| Key | Name |
|---|---|
| 1 | client requirement |

Expert:

Name: john
Division: process eng
Specialization: sen eng
Responsible:

Name: eng.
Division: process eng
Specialization: chemical eng.

-continued

Activity's Technological Card

Date: 12/29/96
Project name: REFINERY
Stage name: process eng
Output name: pfd
Work package name: energy balance definition
Task name: none
Activity name: energy balance calculation
Activity status: Passive (Active \ Passive \ Completed)

| Key | Scheduling start | Scheduling finish | Duration | Cost |
|---|---|---|---|---|
| 39 | 11/2/95 | 17/2/95 | 40.00 | 0.00 |

Input data

| Key | Name | Source | Control |
|---|---|---|---|
| 8 | inlet stream compositions | 1-inp. doc | |
| 9 | inlet stream flowrates | 1-inp. doc | |
| 10 | inlet stream conditions | 1-inp. doc | |
| 12 | outlet stream compositions | 32-activity | |
| 15 | outlet stream flowrates | 32-activity | |
| 16 | outlet stream conditions | 32-activity | |
| 17 | thermodynamic properties | 2-ref. doc | |
| 18 | energy users | 1-inp. doc | |
| 19 | energy producers | 1-inp. doc | |

Output data

| Key | Name | Destination | Control |
|---|---|---|---|
| 21 | energy user loads | 40-activity | |
|  |  | 46-activity | |
| 22 | energy producer loads | 40-activity | |
|  |  | 46-activity | |

Workflow

| Key | Name |
|---|---|
| 2 | input data and run chem-cad simulation, analyse results & perform overall balance |

References:

Output

| Key | Name |
|---|---|
| none | none |

Activities

| Key | Name | Resource |
|---|---|---|
| 32 | mat bal calculations | eng. |
| 40 | pfd equipment table | des eng. |
| 46 | draw sketch of pfd | des eng. |

Reference documents

| Key | Name |
|---|---|
| 2 | manufacturer's catalogue |

Input documents

| Key | Name |
|---|---|
| 1 | client requirement |

Expert:

Name: john
Division: process eng
Specialization: sen eng
Responsible:

-continued

Activity's Technological Card

Name: eng.
Division: process enq
Specialization: chemical eng.

Date: 12/29/96
Project name: REFINERY
Stage name: process eng
Output name: pfd
Work package name: equipment definitions
Task name: none
Activity name: pfd equipment table
Activity status: Passive (Active \ Passive \ Completed)

| Key | Scheduling start | Scheduling finish | Duration | Cost |
|---|---|---|---|---|
| 40 | 18/2/95 | 22/2/95 | 30.00 | 0.00 |

Input data

| Key | Name | Source | Control |
|---|---|---|---|
| 9 | inlet stream flowrates | 1-inp. doc | |
| 10 | inlet stream conditions | 1-inp. doc | |
| 13 | intermediate stream conditions | 32-activity | |
| 14 | intermediate stream flowrates | 32-activity | |
| 15 | outlet stream flowrates | 32-activity | |
| 16 | outlet stream conditions | 32-activity | |
| 21 | energy user loads | 39-activity | |
| 22 | energy producer loads | 39-activity | |

Output data

| Key | Name | Destination | Control |
|---|---|---|---|
| 20 | pfd equipment table | 46-activity | |
|    |                     | 3-out. doc  | |

Workflow

| Key | Name | Resource |
|---|---|---|
| 4 | fill in table in appropriate form | |

References:

Output

| Key | Name |
|---|---|
| 3 | pfd |

Activities

| Key | Name | Resource |
|---|---|---|
| 32 | mat bal calculations | eng. |
| 39 | energy balance calculation | eng. |
| 46 | draw sketch of pfd | des eng. |

Reference documents

| Key | Name |
|---|---|
| none | none |

Input documents

| Key | Name |
|---|---|
| 1 | client requirement |

Expert:

Name: john
Division: process eng
Specialization: sen eng
Responsible:

-continued

Activity's Technological Card

Name; des eng.
Division: process eng
Specialization: chemical eng.

Date: 12/29/96
Project name: REFINERY
Stage name: process eng
Output name: pfd
Work package name: produce pfd
Task name: sketch of pfd
Activity name: draw sketch of pfd
Activity status: Passive (Active \ Passive \ Completed)

| Key | Scheduling start | Scheduling finish | Duration | Cost |
|---|---|---|---|---|
| 46 | 23/2/95 | 23/2/95 | 8.00 | 0.00 |

Input data

| Key | Name | Source | Control |
|---|---|---|---|
| 1 | scope of work | 1-inp. doc | |
| 2 | design basis | 1-inp. doc | |
| 3 | block diagram | 1-inp. doc | |
| 8 | inlet stream compositions | 1-inp. doc | |
| 9 | inlet stream flowrates | 1-inp. doc | |
| 10 | inlet stream conditions | 1-inp. doc | |
| 11 | intermediate stream compositions | 32-activity | |
| 12 | outlet stream compositions | 32-activity | |
| 13 | intermediate stream conditions | 32-activity | |
| 14 | intermediate stream flowrates | 32-activity | |
| 15 | outlet stream flowrates | 32-activity | |
| 20 | pfd equipment table | 40-activity | |
| 21 | energy user loads | 39-activity | |
| 22 | energy producer loads | 39-activity | |
| 16 | outlet stream conditions | 32-activity | |
| 24* | customer's requirements and clarifications | 43-activity | |

Output data

| Key | Name | Destination | Control |
|---|---|---|---|
| 23 | pfd sketch | 48-activity | |

Workflow

| Key | Name |
|---|---|
| 7 | take all known data and prepare sketch for drafting |

References:

Output

| Key | Name |
|---|---|
| none | none |

Activities

| Key | Name | Resource |
|---|---|---|
| 32 | mat bal calculations | eng. |
| 40 | pfd equipment table | des eng. |
| 39 | energy balance calculation | eng. |
| 43 | meetings with client | lead eng. |
| 48 | draw pfd | draughter |

Reference documents

| Key | Name |
|---|---|
| none | none |

Input documents

| Key | Name |
|---|---|

-continued

Activity's Technological Card

| | | | | |
|---|---|---|---|---|
| 1 | | client requirement | | |

Expert:

Name: john
Division: process eng
Specialization: sen eng
Responsible:

Name: des eng.
Division: process eng
Specialization: chemical eng.

Date: 06/04/96
Project name: REFINERY
Output name: pfd
Stage name: process eng
Work package name: produce pfd
Task name: none
Activity name: draw ptd
Activity status: Passive (Active \ Passive \ Completed)

| Key | Scheduling start | Scheduling finish | Duration | Cost |
|---|---|---|---|---|
| 48 | 24/2/95 | 24/2/95 | 2.00 | 0.00 |

Input data

| Key | Name | Source | Control |
|---|---|---|---|
| 23 | prd sketch | 46-activity | |

Output data

| Key | Name | Destination | Control |
|---|---|---|---|
| 26 | pfd | 3-out. doc | |

Workflow

| Key | Name |
|---|---|
| 8 | draw the pfd in AUTOCAD |

References:

Output

| Key | Name |
|---|---|
| 3 | pfd |

Activities

| Key | Name | Resource |
|---|---|---|
| 46 | draw sketch of pfd | des eng. |

Reference documents

| Key | Name |
|---|---|
| none | none |

Input documents

| Key | Name |
|---|---|
| none | none |

Expert:

Name: danuta
Division: drawing office
Specialization: drafter
Responsible:

Name: draughter

-continued

Activity's Technological Card

Division: process eng
Specialization: draughfter

It is appreciated that the software components of the present invention may, if desired, be implemented in ROM (read-only memory) form. The software components may, generally, be implemented in hardware, if desired, using conventional techniques.

It is appreciated that the particular embodiment described in the Appendix is intended only to provide an extremely detailed disclosure of the present invention and is not intended to be limiting.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

Appendix A

It will be appreciated by persons skilled in the art that the present invention is not limited to what has been particularly shown and described hereinabove. Rather, the scope of the present invention is defined only by the claims that follow:

I claim:

1. A method for designing and performing a process, the method comprising:
    a. generating a definition of the process, the generating step including:
       i. defining an output of the process; and
       ii. using a top-down process, defining a top-down structure including a plurality of activities on more than one hierarchical level forming at least one sequence of activities which lead to said output, including defining complete information which includes, for each of said plurality of activities:
          input information, including a source thereof, and output information, including a destination thereof; and
    b. carrying out said process at least partly in accordance with said definition of said process,
       the top-down structure defining step (ii) including prompting the user to decompose the process into activities until the user indicates, for each of said activities, that a constant number of each type of executor is required, throughout said activity, to perform said activity.

2. A method according to claim 1 wherein said complete information is characterized in that carrying out said process in accordance with said complete information in said definition results in said output.

3. A method according to claim 1 wherein said process comprises at least a portion of a refinery manufacturing method.

4. A method according to claim 3 wherein said process comprises constructing a refinery.

5. A method for designing and performing a process, the method comprising:
    a. generating a definition of the process, the generating step including:
       i. prompting a user to define at least one task included in the process; and ii. prompting the user to decompose each task into activities until, for each of said activities, the user indicates that a constant number of executors are required, throughout said activity, to perform said activity; and b. carrying out said process at least partly in accordance with said definition of said process.

6. A method for designing and performing a process, the method comprising:

a. generating a definition of the process, the generating step including:
i. prompting a user to define at least one task included in the process; and
ii. prompting the user to decompose each task into activities until, for each of said activities, the user indicates that an increased number of executors of the activity does not substantially reduce time required to perform the activity; and b. carrying out said process at least partly in accordance with said definition of said process.

7. A method for designing and performing a process, the method comprising:

a. generating a definition of the process, the generating step including:
i. prompting a user to define at least one task included in the process and of at least one input data items for the task; and
ii. prompting the user to decompose each task into activities and to define at least one input data item for each of the activities, until, for each individual activity from among said activities, the user indicates that all of the individual activity's input data items are required to start the individual activity; and b. carrying out said process at least partly in accordance with said definition of said process.

8. A method for designing and performing a process, the method comprising:

a. generating a definition of the process, the generating step including:
i. prompting a user to define an output of the process; and
ii. prompting a user to define a plurality of activities forming at least one sequence of activities which lead to said output, including defining input information items for at least some of said activities and output information items for at least some of said activities;

wherein the prompting step (ii) includes prompting the user to decompose the process into activities until the user indicates, for each individual activity from among said activities, that all of the input information items defined for the individual activity are required to start the activity;

b. analyzing said definition, providing a prompt to the user when a source is not defined from among said activities and said external sources for at least one of said input information items, and providing a prompt to the user when a destination is not defined from among said activities and/or said process output for at least one of said output information items; and c. carrying out said process at least partly in accordance with said definition of said process.

9. A method for designing and performing a process, the method comprising:

a. generating a definition of the process, the generating step including:
i. prompting a user to define a plurality of activities included in said process until the user indicates, for each individual activity, that an increased number of any type of executor of the individual activity does not substantially reduce time required to perform the activity;
ii. prompting a user to define a plurality of data items which serve as inputs and outputs to individual activities from among said plurality of activities;
iii. prompting the user to optionally define one or more of said plurality of data items as iterative; and
iv. if the user elects to define at least one data item having at least one destination activities as iterative, prompting the user to define a loop initiating activity and a process generator operative to generate a loop which includes said data item and to define an exit point from said loop; and b. carrying out said process in accordance with said definition of said process, including prompting the user to reperform said loop if said iterative data item is not confirmed by at least one of its destination activities.

10. A method according to claim 9 wherein the iterative data item is generated by a source activity and the loop includes a looped sequence of activities included first and last activities and said last activity is the source activity for said iterative data item and wherein said if-prompting step comprises:

prompting the user to select a selected activity from among activities preceding said source activity and to define the selected activity as the loop's first activity and as a destination activity for said iterative data item.

11. A method for designing and performing a process, the method comprising:

a. generating a definition of the process, the generating step including:
i. prompting a user to define a plurality of activities included in said process, until the user indicates, for each of said activities, that an increased number of any type of executor of the task does not substantially reduce time required to perform the task; and
ii. prompting a user to define a plurality of data items which serve as inputs and outputs to individual destination and source activities, respectively; and b. carrying out said process in accordance with said definition of said process, said carrying out step including:
i. obtaining confirmation of each data item at least from each destination activity thereof from among said plurality of activities;
ii. starting each individual activity from among said plurality of activities only when, for each individual data item from among all input data items for said individual activity, all destination activities of said individual data item have confirmed said individual data item.

12. A method according to claim 11 and also comprising defining an individual activity as complete only when each individual data item from among all output data items for the individual activity has been confirmed.

13. A method for designing a process, the method comprising:

prompting a user to define at least one task included in the process; and prompting the user to decompose at least one task into activities until, for each of said activities, the user indicates that a constant number of executors are required, throughout said activity, to perform said activity.

14. Apparatus for designing a process, the apparatus comprising:
   a process definition generator operative to generate a definition of the process, the generator being operative:
   i. to prompt a user to define at least one task included in the process; and
   ii. to prompt the user to decompose the at least one task into activities until, for each individual activity from among said activities, the user indicates that an increased number of executors of the individual activity does not substantially reduce time required to perform the activity.

15. A method for designing a process, the method comprising:
   i. accepting a user's definition of at least one tasks included in the process and of at least one input data items for the task; and
   ii. prompting the user to decompose the at least one task into activities and to define at least one input data item for each of the activities, until, for each individual activity from among said activities, the user indicates that each of the individual activity's input data items are required to start the individual activity.

16. Apparatus for designing a process, the apparatus comprising:
   a. a process definition generator operative to generate a definition of the process, the generator being operative:
      i. to prompt a user to define an output of the process; and
      ii. to prompt a user to define a plurality of activities forming at least one sequence of activities which lead to said output, including
         1. prompting the user to decompose the process into activities and
         2. prompting a user to define input information items for at least some of said activities and output information items for at least some of said activities; and
   wherein the user is prompted to decompose the process into activities until the user indicates, for each individual activity from among said activities, that all of the input information items defined for the individual activity are required to start the activity;
   b. a definition analyzer operative to provide a prompt to the user when a source is not defined from among said activities and said external sources for at least one of said input information items, and to provide a prompt to the user when a destination is not defined from among said activities and/or from process outputs for at least one of said output information items.

17. Apparatus for designing and performing a process, the apparatus comprising:
   a. a process definition generator operative to generate a definition of the process, the generator being operative:
      i. to prompt a user to define a plurality of activities included in said process
      ii. to prompt a user to define a plurality of data items which serve as inputs and outputs to individual activities from among said plurality of activities and to continue to decompose the process into activities until the user indicates, for each individual activity from among said activities, that all of the input data items which serve as inputs for the individual activity are required to start the activity;
      iii. to prompt the user to optionally define one or more of said plurality of data items as iterative; and
      iv. if the user elects to define at least one data item having at least one destination activities as iterative, to prompt the user to define a loop initiating activity and a process generator operative to generate a loop which includes said data item and to define an exit point from said loop; and
   b. process performing apparatus operative to carry out said process in accordance with said definition of said process, including prompting the user to reperform said loop if said iterative data item is not confirmed by at least one of its destination activities.

18. Apparatus for designing and performing a process, the apparatus comprising:
   a. a process definition generator operative to generate a definition of the process, the generator being operative to:
      i. prompting a user to define a plurality of activities included in said process until the user indicates that an increased number of any type of executor of the task does not substantially reduce time required to perform the task; and
      ii. prompt a user to define a plurality of data items which serve as inputs and outputs to individual destination and source activities, respectively; and
   b. process performing apparatus operative to carry out said process in accordance with said definition of said process, said process performing apparatus including:
      i. data item confirmation apparatus operative to obtain confirmation of each data item at least from each destination activity thereof from among said plurality of activities; and
      ii. an activity initiator operative to start each individual activity from among said plurality of activities only when, for each individual data item from among all input data items for said individual activity, all destination activities of said individual data item have confirmed said individual data item.

19. A method for designing and performing a process for manufacturing goods, the method comprising:
   prompting a user to define at least one process output;
   for at least one process output, prompting a user to perform a top-down breakdown, thereby to generate a hierarchy of tasks and defined relationships therebetween, such that if the tasks are performed in accordance with the defined relationships therebetween, at least one output of at least one task comprises the at least one process output; and
   carrying out said process at least partly in accordance with said hierarchy of tasks and said defined relationships, wherein each task in the hierarchy of tasks is performed by at least one type of executor and a constant number of each type of executor is required to perform each task.

20. A method for designing and performing a process, the method comprising:
   a. generating a definition of the process, the generating step including:
      i. defining an output of the process; and
      ii. defining a plurality of activities forming at least one sequence of activities which lead to said output, including defining complete information which includes, for each of said plurality of activities:
         input information, including a source thereof, and
         output information, including a destination thereof; and
   b. carrying out said process at least partly in accordance with said definition of said process, wherein at least one activity has a source which is external to the at least one sequences of activities, and
wherein the user is prompted to define activities until the user indicates that an increased number of any type of executor of the task does not substantially reduce time required to perform the task.

21. A method for designing and performing a process, the method comprising:
  a. generating a definition of the process, the generating step including:
    i. defining an output of the process; and
    ii. defining a plurality of activities forming at least one sequence of activities which lead to said output, including defining complete information which includes, for each of said plurality of activities:
      input information, including a source thereof, and
      output information, including a destination thereof;
wherein the user is prompted to define activities until the user indicates that all of the input information defined for each individual activity is required to start the activity; and
  b. carrying out said process at least partly in accordance with said definition of said process,
wherein at least one activity has a destination which is external to the at least one sequences of activities, the destination comprising said output of the process.

\* \* \* \* \*